(12) United States Patent
Salvisberg

(10) Patent No.: US 7,280,905 B1
(45) Date of Patent: Oct. 9, 2007

(54) SYSTEM AND METHOD FOR MAXIMIZING POWER OUTPUT FROM AN INTERNAL COMBUSTION ENGINE

(76) Inventor: Marc W. Salvisberg, 855 San Anselmo Ave., San Anselmo, CA (US) 94960

( * ) Notice: Subject to any disclaimer, the term of this patent is extended or adjusted under 35 U.S.C. 154(b) by 21 days.

(21) Appl. No.: 11/404,242

(22) Filed: Apr. 15, 2006

(51) Int. Cl.
*G06F 19/00* (2006.01)
(52) U.S. Cl. .................. 701/104; 701/114; 73/117.3
(58) Field of Classification Search ............. 701/104, 701/102, 110, 114; 73/117.3
See application file for complete search history.

(56) References Cited

U.S. PATENT DOCUMENTS

| | | | | |
|---|---|---|---|---|
| 4,129,034 A | * | 12/1978 | Niles et al. ............... | 73/117.3 |
| 4,693,077 A | * | 9/1987 | Skarvan et al. .......... | 60/39.282 |
| 6,199,006 B1 | * | 3/2001 | Weiss et al. ................ | 701/102 |

* cited by examiner

*Primary Examiner*—Hieu T. Vo
(74) *Attorney, Agent, or Firm*—Cherskov & Flaynik

(57) ABSTRACT

A system 10 and method for maximizing power output from an internal combustion engine includes a control module 12, a motor power output measuring member 14, a microprocessor based digital computer 16, connections 18 between a control module input 13 and the computer 16, and connections 20 between a control module output 15 and one or more existing motor power variable control members 22 including, but not limited to, fuel injectors, ignition timing components and air flow control components.

20 Claims, 2 Drawing Sheets

System For Maximizing Motor Power Output

SYSTEM AND METHOD FOR MAXIMIZING POWER OUTPUT FROM AN INTERNAL COMBUSTION ENGINE

BACKGROUND OF THE INVENTION

1. Field of the Invention

The present invention relates generally to improving or maximizing power output from an internal combustion engine and, more particularly, to changing engine power variables such as fuel flow, ignition timing and intake air flow, and measuring the corresponding engine power output for each power variable change until engine power output is maximized.

2. Background of the Prior Art

Internal combustion engines develop output power based upon a multiple of power variables including, but not limited to, fuel flow, ignition timing, intake air flow and many other power parameters. Prior art techniques for maximizing engine performance or "tuning" the engine, include manually adjusting an air-fuel mixture pursuant to manufacturer specifications, or using an oxygen sensor in the engine exhaust flow to provide an input to a digital computer that controls fuel flow to the engine via fuel injectors thereby forming a "closed loop" control system. The goal of the prior art control system is a stoichiometric air-fuel mixture that achieves optimum fuel economy. For gasoline, a stoichiometric air-fuel ratio that achieves optimum fuel economy is 14.7 parts air to 1 part fuel by weight. Air-fuel ratios less than 14.7 to 1 (running rich) result in decreased engine power and decreased fuel economy. Greater air-flow ratios (running lean) can damage an engine.

One prior art method (U.S. Pat. No. 6,681,752) of automatic tuning of fuel injected engines includes replacing an existing oxygen sensor with a wide band oxygen sensor in the exhaust flow to achieve a stoichiometric air-fuel ratio and optimum fuel economy.

Another prior art method (U.S. Pat. No. 6,745,620) of automatic tuning of fuel injected engines includes an oxygen sensor in the exhaust flow to provide feedback for closed loop control of an internal combustion engine's air-fuel ratio to appropriate target specifications. More specifically, the method automates the process of providing a "map" of optimum air-fuel ratios for each operating condition (a given throttle position and revolutions per minute ("RPM")) of the vehicle.

The problem with prior art tuning methods is that internal combustion engine fuel economy is optimized instead of power output for a preselected RPM rate. Racing vehicles such as motorcycles require maximum engine power output not optimizing fuel economy. A motorcycle racing on undulating or relatively short raceways requires maximum output power at one RPM, while the same motorcycle operating on a relatively long raceway requires a maximum engine power output at a different RPM. Maximizing engine power output reduces the air-fuel ratio and fuel economy at the selected RPM rate, but increases the chance of winning the race. A tradeoff every motorcycle racer is more than willing to accept.

Besides racing vehicles, internal combustion engines are used at installations that require the engine to operate at one of two speeds, idle or at maximum RPM. These installations include, but are not limited to, pumps, compressors, and cooling fans. The maximum RPM rate for the installation, corresponds to the maximum power output required during operation of the equipment. Maximum power output is required during operation, not fuel economy.

Another problem with prior art tuning methods is that only the air-fuel ratio is controlled to achieve optimum engine performance, i.e. fuel economy. The prior art methods do not control other power variables such as engine ignition timing, intake air flow or fuel flow cooperating with carburetors to achieve optimum engine performance.

A need exist for a system and method for maximizing internal combustion engine power output for a preselected RPM by providing closed loop control that uses engine power output as a feedback signal to a digital computer, the computer providing an output signal to a controller that adjusts the magnitude of a selected power variable including, but not limited to fuel flow, ignition timing and/or intake air flow.

SUMMARY OF THE INVENTION

It is a principle object of the present invention to provide a system for improving or maximizing power output from an internal combustion engine. A feature of the system is a control module for adjusting magnitudes of engine power variables. An advantage of the system is that any one or all engine power variables including, but not limited to, fuel flow, ignition timing and air intake flow, may be analyzed to determine if maximum engine output power is being produced for each engine power variable.

Another object of the present invention is to provide a system that incorporates a power measuring device such as a dynamometer to provide "real time" or "sweep test" engine power output measurements. A feature of the system is that an engine power output measurement is provided for each initial magnitude of each power variable. Another feature of the system is that an engine power output measurement is provided for each magnitude change of each power variable. Yet another feature of the system is that the dynamometer provides an immediate corresponding engine power output measurement for each initial or changed magnitude of each power variable. An advantage of the system is that a faster engine power output improvement system is provided. Another advantage of the system is that a more accurate engine power output improvement system is provided.

Still another object of the present invention is to provide a system that incorporates a control module for controlling fuel flow and ignition timing. A feature of the system of the system is that two key power variables are controlled by one controller. An advantage of the system is the reduction of "setup" time required to maximize engine power output.

Yet another object of the present invention is to provide a system that incorporates a microprocessor based digital computer for adjusting magnitudes of engine power variables based upon measured engine power output corresponding to changing magnitudes of engine power variables. A feature of the system is "closed loop" control for each engine power variable based upon engine power output. An advantage of the system is that engine power output is improved or maximized faster and more accurately.

Another object of the present invention is to provide a method for improving or maximizing power output from an internal combustion engine. A feature of the method is that an engine power variable is controlled to provide improved or maximum engine power output at a predetermined RPM rate or in a "narrow" RPM range. An advantage of the method is that by maximizing engine power output at a predetermined RPM rate or range, maximum velocity is achieved by a racing vehicle to increase the likelihood that the vehicle will win the race. Another advantage of the method is that by maximizing engine power output at a predetermined RPM rate or range, optimum performance is achieved by an engine that operates either at idle or at maximum load.

Another object of the present invention is to provide a method that produces maximum engine power output based upon race track characteristics and the maximum velocity that a vehicle can achieve on the race track. A feature of the method is that given the maximum vehicle velocity for a given track, an engine RPM rate is calculated and engine power output is maximized for the calculated RPM rage. An advantage of the method is that the chance of a vehicle winning a race is maximized for each racing track that the vehicle performs upon.

Another object of the present invention is to provide a method that reduces or increases magnitudes of engine power variables to achieve maximum engine power output. A feature of the method is that a computer is programmed to both increase and decrease initial magnitudes of engine power variables until corresponding dynamometer measurements provide a maximum engine power output. Another feature of the method is that a fuel flow engine power variable is changed to maximize engine power output. Still another feature of the method is that the fuel-air ratio is not an engine power variable that is modified to maximize engine power output. An advantage of the method is that engine power output is maximized rather than an air-fuel mixture being optimized for fuel economy at the expense of engine power output.

Briefly the invention provides a method for improving or maximizing power output from an internal combustion engine, said method comprising the steps of providing a control module for the internal combustion engine; connecting said control module to a power measuring member; connecting said control module to an engine power variable control member; measuring power output from the internal combustion engine over a predetermined RPM range ro rate, or at a predetermined throttle position; entering power output into a microprocessor; changing a power variable of the internal combustion engine; re-measuring power output from the internal combustion engine over the predetermined RPM range; adjusting the power variable based upon the measured and re-measured power outputs from the internal combustion engine; re-measuring power output from the internal combustion engine and re-adjusting the power variable until maximum power output from the internal combustion engine has been obtained for the power variable; changing another power variable of the internal combustion engine; and repeating the above steps beginning with the step of re-measuring power output from the internal combustion engine over the predetermined RPM range, and continuing through and including the step of re-measuring power output from the internal combustion engine and re-adjusting the power variable until maximum power output from the internal combustion engine has been obtained for the power variable, the step repetition to continue until maximum power output from the internal combustion engine has been obtained for all power variables.

The invention further provides a method for maximizing motor power output, said method comprising the steps of controlling motor fuel flow and ignition timing via a single controller; measuring motor power output; recording measured motor power output; adjusting motor fuel flow; maximizing motor power output relative to motor fuel flow; adjusting ignition timing; maximizing motor power output relative to ignition timing; and repeating the steps beginning with the step of adjusting motor fuel flow, and continuing through and including the step of maximizing motor power relative to ignition timing, said repetition step to continue until maximum motor power has been obtained relative to motor fuel flow and ignition timing for a predetermined RPM range.

The invention further provides a system for maximizing motor power output comprising means for controlling a first motor power variable; means for measuring motor power output; means for storing said measured motor power output; means for adjusting the first motor power variable; means for maximizing motor power output relative to the first motor power variable; means for controlling a second motor power variable; means for maximizing motor power output relative to the second motor power variable; and means for maximizing motor power output relative to all preselected motor power variables.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Figure 1:
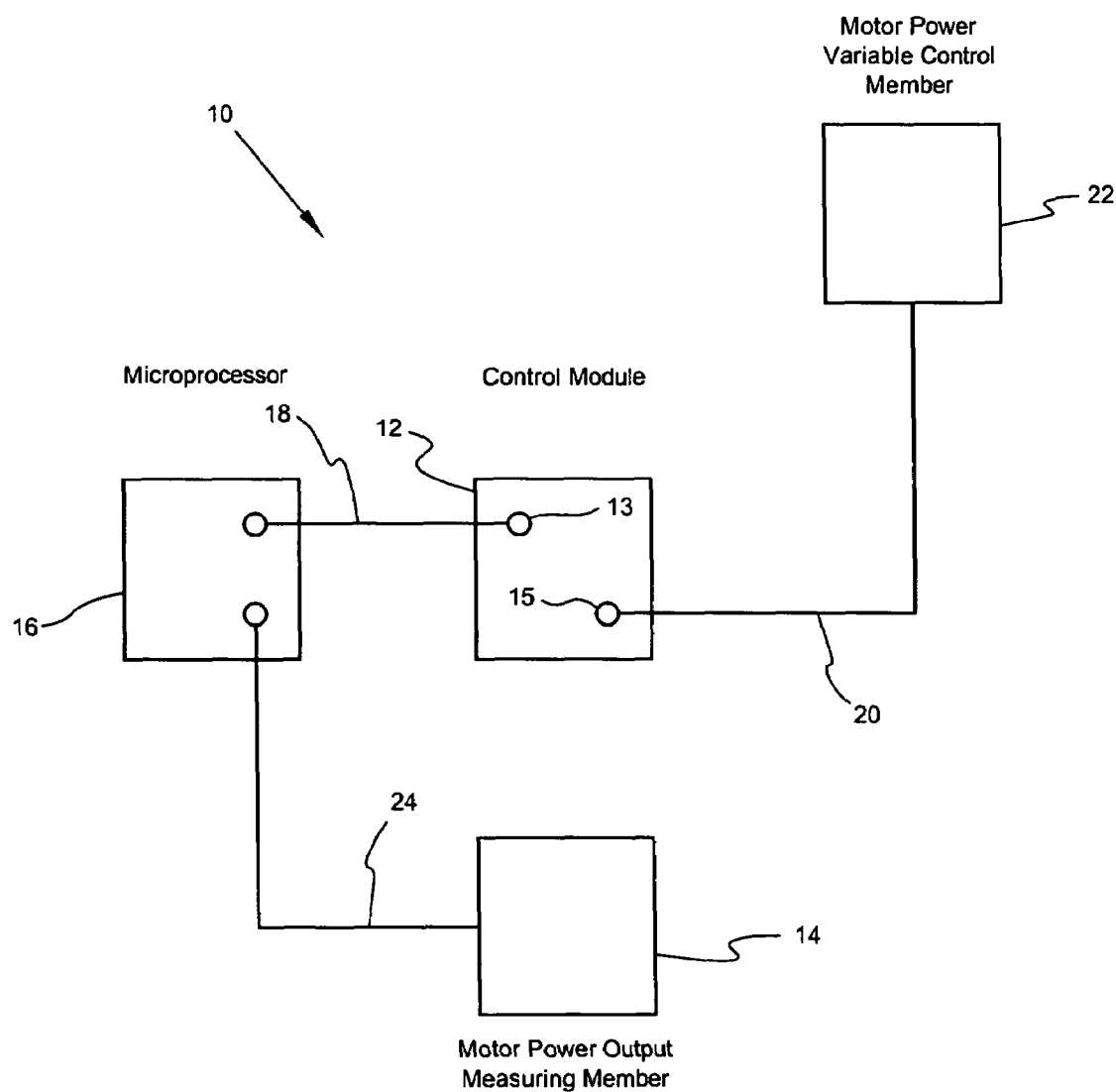
FIG. 1 is a block diagram of a system for maximizing motor power output in accordance with the present invention.

The present invention provides a system and method for improving or maximizing power output from an internal combustion engine or motor. Referring now to FIG. 1, a system for maximizing motor power output in accordance with the present invention is denoted by numeral 10. The system includes a control module 12, a motor power output measuring member 14 which includes a microprocessor 16, connections 18 between a control module input 13 and the microprocessor 16, and connections 20 between a control module output 15 and one or more existing motor power variable control members 22 including but not limited to fuel injectors, ignition timing components and air flow control components.

The control module 12 may include a plurality of single parameter controllers for each one of the motor power control members which control a corresponding engine power variables such as fuel flow, ignition timing and intake air flow. The control module 12 may be a controller capable of adjusting multiple motor power control members. For example, a module well known in the art is a Teka 4 fuel injection module, manufactured by Factory Pro, located at 179 Paul Drive, San Rafael, Ca 94903. The Teka 4 control module 12 allows an individual to control fuel flow and ignition timing via output signals from the microprocessor 16.

The motor power output measuring member 14 includes dynamometers such as model EC997 manufactured by Factory Pro, or equipment to conduct a "cylinder by cylinder" power output measurement OBD2 information (standard automotive EPA defined data stream) well known to those of ordinary skill in the art. The motor power output measuring member or dynamometer 14 provides an output signal (corresponding to the magnitude of motor power output) to the microprocessor 16 via connection 24. The microprocessor 16 is model no. DSP 56303 or 6800 series both manufactured by Motorola, although a myriad of substitute microprocessors may substituted therefor, all well known to those of ordinary skill in the art. The microprocessor 16 may be included with the dynamometer or may be an independent unit. The connections 18, 20 and 24 joining together the control module 12, dynamometer 14, microprocessor 16 and motor power variable control members 22, may be either wired or wireless. Wired connections are generally shielded 20 gauge copper or aluminum conductors. Wireless connections include infra red (IR), bluetooth, WIFI, radio frequency (RF), IEEE 802.11 RF and other well known methods of wireless connection.

Figure 2:
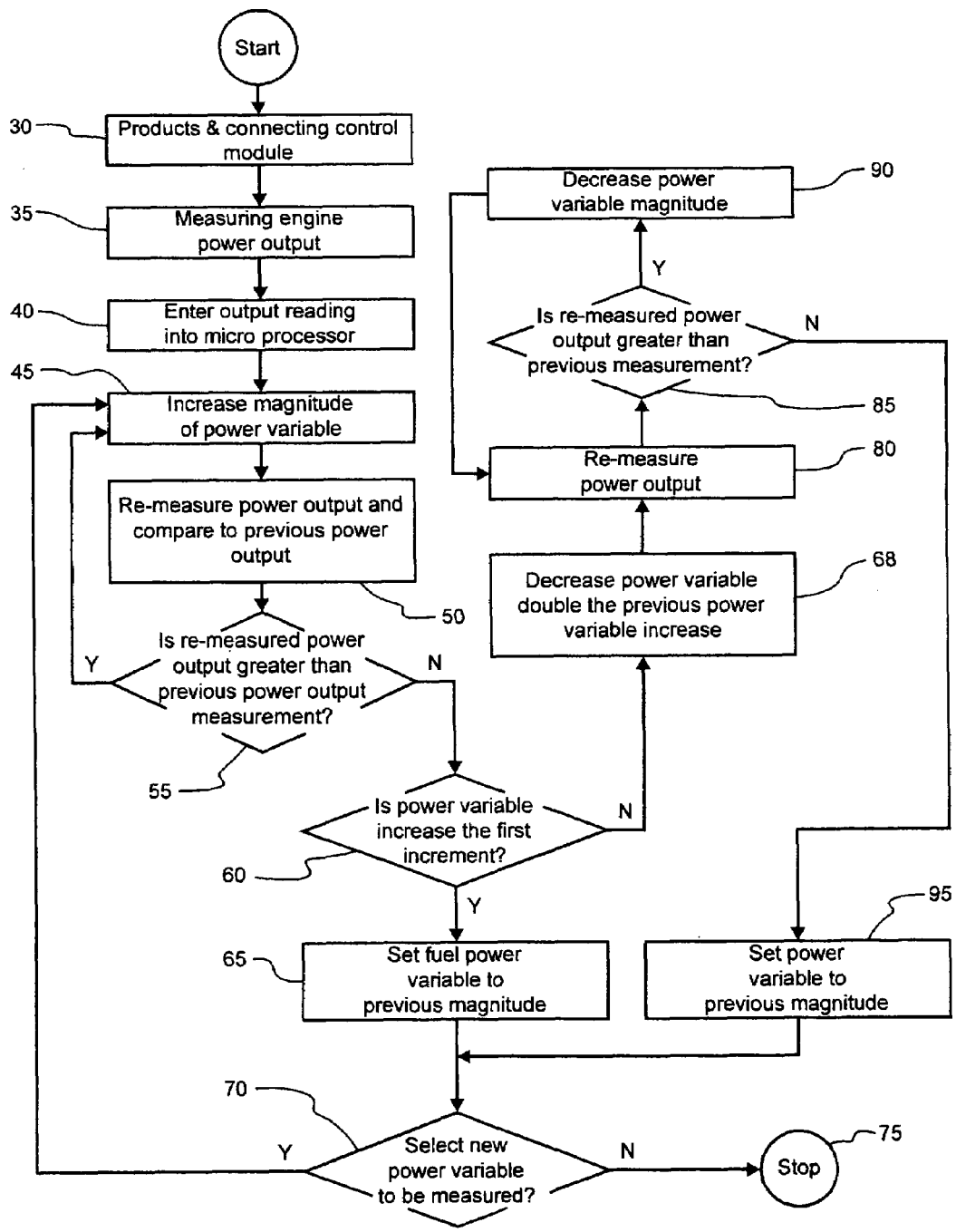
FIG. 2 is a flow diagram of a method for improving or maximizing the output power from an internal combustion engine in accordance with the present invention.

Referring now to FIG. 2, a flow chart of a method for improving or maximizing the output power from an internal combustion engine in accordance with the present invention is depicted. Referring to block 30, the method starts by installing a Teka 4 fuel injection control module 12 on a vehicle proximate to the internal combustion engine. An input 13 of the Teka 4 fuel injection module 12 is connected via wired or wireless connections 18 to the microprocessor 16, and an output 15 of the module 12 is connected to one or more engine power control members such as fuel injectors (not depicted) via wired or wireless connections 20. The engine power control members via discrete components, adjust power variables which include fuel flow, intake air flow, ignition timing and exhaust flow. Based on the input signal 13, the module 12 calculates and provides a corresponding output signal 15 to one or more fuel injectors which provide fuel to the cylinders of the internal combustion engine. The module 12 output signal 15 allows the control module 12 to increase or decrease the quantity of fuel flowing from the fuel injectors to the internal combustion engine.

The Teka 4 fuel injection module 12 is capable of providing output signals 15 to both the fuel injectors and the timing module (not depicted). The timing signal circuitry is re-configured such that the Teka 4 module 12 is capable of advancing or retarding the timing signal thereby firing cylinder spark plugs sooner or later than was previously programmed. The fuel flow and ignition timing parameters are directly controlled by the microprocessor 16 which is correspondingly programmed by the individual attempting to improve or maximize output power from the engine. The more improvement required from an internal combustion engine, the more time (and money) that must invested into the method to achieve substantial or maximum increased power output from the engine. After the method has increased the motor output power to a required magnitude, the microprocessor 16 maintains the achieved level of output power by continually reviewing information from the dynamometer 14, and providing corresponding outputs to all engine power control members.

Referring now to block 35, the next step for improving or maximizing power output from an internal combustion engine is to measure power output from the engine via the dynamometer 14 over a predetermined RPM range. Selecting a relatively small RPM range is particularly important to individuals that race motorcycles or automobiles. Motorcycle and automotive racing is conducted over varying courses including undulating surfaces requiring a motorcycle or automobile to provide maximum output power in an RPM range (and range of throttle positions) corresponding to the race course. The measured engine power output is then entered and stored in the microprocessor 16 pursuant to block 40.

Referring now to block 45, the method for improving or maximizing power output requires the step of changing the magnitude of an engine power variable by modifying an output signal from the microprocessor 16 to a corresponding power control member. The first engine power variable that is modified is fuel flow. The initial fuel flow magnitude change is a five percent flow increase promoted by the microprocessor 16 producing an output signal to the fuel injectors that causes a five percent increase in the quantity of time that the injectors remain open thereby increasing the quantity of fuel into a corresponding cylinder five percent. The five percent magnitude increase has been empirically discovered as an optimum change parameter for motorcycles, however, any magnitude increase may be used for improving or maximizing engine power output. Pursuant to the step of block 50, the power output from the engine over the same RPM range is re-measured via the dynamometer 14 with the increased fuel flow to the cylinders. The re-measured engine power output is stored in the microprocessor 16, then compared to the previous power output measurement.

Referring now to decision block 55, if the first re-measured engine power output is greater than the previous power output measurement, then the method returns to block 45 where the power variable magnitude (initially fuel flow) increase loop is repeated until an engine power output increase is not realized when increasing fuel flow, whereupon, the microprocessor 16 in block 60 determines if the power variable increase was the first increase of the power variable. If the power variable increase is a second or higher number increase, then pursuant to block 65, the microprocessor 16 provides an output signal to the power variable control member (fuel injectors) corresponding to the previous power variable magnitude (fuel flow) that promoted the last motor power output increase. Referring again to block 60, if the power variable increase is the first increase and does not increase engine power output, then pursuant to block 68, the microprocessor 16 initiates a reduction in magnitude of the power variable equal to double the initial magnitude increase of the power variable thereby promoting an output power measurement for a power variable magnitude lower than the magnitude at the start of the power improvement method. For example, if fuel flow to the engine at the start of the present method was 1.0 gallons per hour which produced a first engine power output, the fuel flow would be initially increased to 1.05 gallons per hour, and a second engine power output would be measured. If the second engine output power is less than the first output power at the 1.05 per gallon flow rate, then the fuel flow magnitude would be reduced to substantially 0.95 gallons and a third engine power output would be measured.

If the power variable has been set to a previous magnitude pursuant to block 65, then a new power variable (such as ignition timing) pursuant to block 70 is selected for measurement and change to ultimately improve or maximize engine power output according to the present invention. If there are no remaining power variables to be measured, then the method is complete with no further measurement required (block 75). If power variables remain, then the method returns to block 45 where the magnitude of the power variable is initially increased and the improvement method continues.

Referring again to block 68, if the power variable magnitude has been decreased, engine power output is re-measured pursuant to block 80. If the re-measured power output is greater than the previous engine power measurement (see block 85), then the power variable magnitude is again decreased a pre-selected amount (generally five percent) pursuant to block 90. The power variable magnitude decrease loop is repeated until a re-measured engine power output is not greater than the previous engine power output measurement, whereupon, the power variable magnitude is re-set to the previous magnitude pursuant to block 95, and the method returns to the input of block 70 to determine if there are any power variables remaining that require measurement and change for improving or maximizing engine power output.

The fuel flow power variable discussed above refers to fuel injectors as the power control member for fuel flow. The present method for improving power output from an internal combustion engine may be utilized to improve power output from an engine that includes a carburetor fuel control system. Further, any parameter related to engine power may be utilized to improve engine power output; the parameters including, but not limited to, exhaust gas flow, temperature and composition, engine temperature and RPM, vehicle velocity and vibration, and engine power output operating "smoothness."

While this invention has been described with reference to its presently preferred embodiment, it is not limited thereto. Rather, the invention is limited only insofar as it is defined by the following set of patent claims and includes within its scope all equivalents thereof.

The invention claimed is:

1. A system for maximizing motor power output comprising:
   means for controlling a first motor power variable;
   means for measuring motor power output;
   means for storing said measured motor power output;
   means for adjusting the first motor power variable;
   means for maximizing motor power output relative to the first motor power variable;
   means for controlling a second motor power variable;
   means for maximizing motor power output relative to the second motor power variable; and
   means for maximizing motor power output relative to all preselected motor power variables.

2. A method for maximizing motor power output, said method comprising the steps of:
   controlling motor fuel flow and ignition timing via a single controller;
   measuring motor power output;
   recording measured motor power output;
   adjusting motor fuel flow;
   maximizing motor power output relative to motor fuel flow;
   adjusting ignition timing;
   maximizing motor power output relative to ignition timing; and
   repeating the steps beginning with the step of adjusting motor fuel flow, and continuing through and including the step of maximizing motor power relative to ignition timing, said repetition step to continue until maximum motor power has been obtained relative to motor fuel flow and ignition timing for a predetermined RPM range.

3. The method of claim 2 wherein the step of controlling motor fuel flow and ignition timing includes the step of providing a Teka 4 fuel injection module.

4. The method of claim 2 wherein the step of controlling motor fuel flow and ignition timing includes the step of controlling selected motor power variables.

5. A method for improving or maximizing power output from an internal combustion engine, said method comprising the steps of:
   providing a control module for the internal combustion engine;
   connecting said control module to a power measuring member;
   connecting said control module to an engine power variable control member;
   measuring power output from the internal combustion engine over a predetermined RPM range;
   entering power output into a microprocessor;
   changing a power variable of the internal combustion engine;
   re-measuring power output from the internal combustion engine over the predetermined RPM range;
   adjusting said power variable based upon said measured and re-measured power outputs from the internal combustion engine;
   re-measuring power output from the internal combustion engine and re-adjusting said power variable until maximum power output from the internal combustion engine has been obtained for said power variable;
   changing another power variable of the internal combustion engine; and
   repeating the steps beginning with the step of re-measuring power output from the internal combustion engine over the predetermined RPM range, and continuing through and including the step of re-measuring power output from the internal combustion engine and re-adjusting said power variable until maximum power output from the internal combustion engine has been obtained for said power variable, said step repetition to continue until maximum power output from the internal combustion engine has been obtained for all power variables.

6. The method of claim 5 wherein the step of installing a control module includes the step of installing a Teka 4 fuel injection module.

7. The method of claim 5 wherein the step of connecting said fuel injection module to a power measuring member includes the step of providing a dynamometer.

8. The method of claim 5 wherein the step of connecting said control module to a power measuring member includes the step of wiring said control module to said power measuring member.

9. The method of claim 5 wherein the step of connecting said control module to a power measuring member includes the step of utilizing wireless connections.

10. The method of claim 9 wherein the step of utilizing wireless connections includes the step of using wireless connections from the group consisting of infra red, bluetooth, WIFI and combinations thereof.

11. The method of claim 5 wherein the step of measuring a power output from the internal combustion engine includes the step of measuring power output from each cylinder in the internal combustion engine.

12. The method of claim 5 wherein the step of measuring a power output includes the step of measuring power variables.

13. The method of claim 5 wherein the step of entering power output includes the step of entering measured power into a Teka 4 fuel injection module.

14. The method of claim 5 wherein the step of changing a power variable includes the step of programming said fuel injection module to vary the quantity of fuel to the engine.

15. The method of claim 5 wherein the step of changing a power variable includes the step of programming said fuel injection module to vary ignition timing.

16. The method of claim 5 wherein the step of re-measuring power output includes the step of re-measuring power parameters.

17. The method of claim 5 wherein the step of adjusting said power variable includes the step of programming said fuel injection module to vary the quantity of fuel to the engine.

18. The method of claim 5 wherein the step of adjusting said power variable includes the step of programming said fuel injection module to vary ignition timing.

19. The method of claim 5 wherein the step of changing another power variable includes the step of changing air flow to the cylinders of the internal combustion engine.

20. The method of claim wherein the step of measuring power output from the internal combustion engine over a predetermined RPM range includes the step of measuring power output from the internal combustion engine at pre-selected throttle positions.

* * * * *